May 23, 1961    R. G. RHUDY    2,985,106
THERMAL INSULATION SYSTEM
Original Filed April 3, 1953
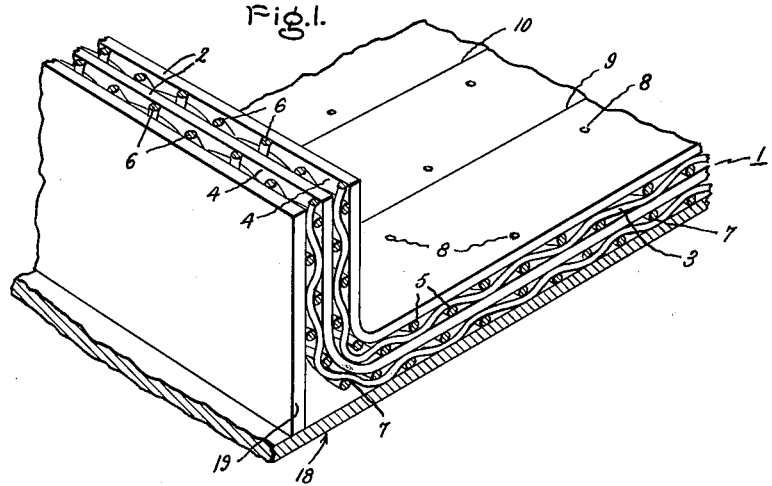
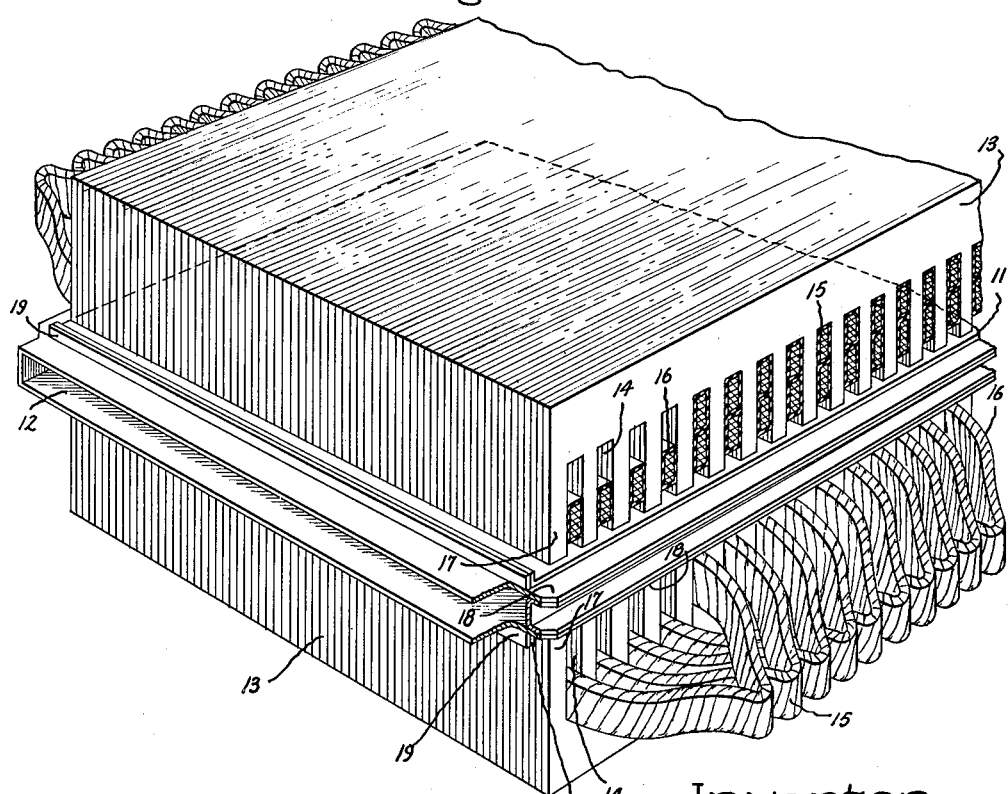
Inventor:
Ralph G. Rhudy,
by Paul A. Frank
His Attorney.

United States Patent Office 2,985,106
Patented May 23, 1961

2,985,106

THERMAL INSULATION SYSTEM

Ralph G. Rhudy, Scotia, N.Y., assignor to General Electric Company, a corporation of New York Continuation of application Ser. No. 346,713, Apr. 3, 1953. This application May 28, 1958, Ser. No. 739,960

5 Claims. (Cl. 103—1)

The invention described herein is a continuation of applicant's prior application Serial No. 346,713, filed April 3, 1953, now abandoned, for Thermal Insulation System.

My invention relates to thermal insulation systems and in particular to such systems adapted for use in relatively high temperatures.

In the transfer of very hot liquids, such as liquid sodium, from one place to another through pipes or tubes, it is desirable to provide thermal insulation surrounding those pipes to prevent the loss of heat, and further, it may be essential to insulate the pipe to prevent damage to equipment adjacent thereto. In installations where the space factor is important or where uniformity of thickness of thin layers of insulation is required, materials ordinarily used for high temperature applications are unsatisfactory. Ceramic insulation materials are fragile and are susceptible to breakage when exposed to expansion, shock, and vibration incident to such use. Asbestos is subject to crumbling with the resultant deterioration in its insulating capabilities; and rock wool can be used only where other structure is available to keep it from being compressed. Further, it is frequently necessary, as in the case of electromagnetic liquid metal pumps, to provide an insulation of high uniformity in thickness in the region between the duct containing the liquid metal and the magnetic elements which is suitable for use in a changing magnetic flux.

My invention contemplates an insulation system which offers a solution to these problems and which is easy to manufacture and install.

Accordingly, an object of my invention is to provide an efficient insulation system adapted for use in a high temperature region.

Also, it is an object of my invention to provide an insulation system adaptable for use in a high temperature region and to serve as a stable mechanical spacing element.

Another object of my invention is to provide a thermal insulation system made entirely of metal.

Further objects and advantages of my invention will become apparent and my invention will be better understood by reference to the accompanying drawing and description, and the features of novelty which characterize my invention will be pointed out with particularity in the claims annexed to and forming a part of this specification.

Briefly stated, in accordance with one aspect of my invention, I provide a basic layer of insulating material formed of a thin sheet of metal having reflecting surfaces, that is to say surfaces of low thermal emissivity, and a spacing member formed from a metal cloth of high thermal resistivity. The thermal insulation system is formed by using the desired number of these basic layers to provide the desired thermal resistance. For use in electromagnetic fields, the metal sheets may be cut in strips to restrict transverse eddy currents.

In the drawing:

Fig. 1 is a fragmentary perspective view illustrating one form of my invention; and Fig. 2 is a fragmentary perspective view illustrating one embodiment of my invention as applied to an electromagnetic liquid metal pump.

Referring now to the drawing, I have shown in Fig. 1 one method of practicing my invention which illustrates a thermal insulation system comprising two basic insulating layers 1. As shown, each basic insulating layer 1 comprises means to serve as a heat radiation barrier in the form of a thin sheet 2 and means to serve as a spacing member in the form of a cloth or mesh 3. Cloth 3 of the adjacent basic insulating layer 1 is positioned in contact with wall 18 of conduit or duct 12 as best shown in Fig. 2. Plate 19 defines the end of the length of conduit 12 to be insulated. While I have shown a thermal insulation system in Fig. 1 comprising two basic insulating layers 1, it is apparent that any number of basic insulating layers 1 may be used to obtain the desired insulating properties of the insulation system.

The sheet 2 may be of any desired thickness and formed from any material; however, in the practice of my invention I find that sheet metals having thicknesses in the order of 0.010" when used as heat radiation barriers, produce an insulation of minimum thickness and yet retain the necessary rigidity for fabrication purposes and provide the insulation with necessary physical strength. It is further desirable to fabricate sheets 2 from a metal having surfaces 4 of low thermal emissivity. This property will ordinarily be found in metals having bright surfaces which will serve as reflectors, and while any such metal can be used, I prefer to use alloys of iron containing chromium and possibly nickel. Such alloys of iron are commonly called stainless steels and are known for their resistance to surface oxidation and discoloration in high temperature use.

In the embodiment shown, I provide a spacing member between adjacent sheets 2. It is desirable to use cloth or mesh 3 which is formed by a plurality of transverse strands 5 interwoven with a plurality of longitudinal strands 6. Strands 5 and 6 are preferably not integrally connected at their junction points 7 and the mesh is held together by its physical configuration. While strands 5 and 6 may be of any material capable of withstanding the temperatures to be encountered in use, which in the case of liquid sodium may be as high as approximately 900° C., it is desirable to use strands formed of metal, and specifically stainless steels, because of their relatively high thermal resistivities and their resistance to deformation in the presence of mechanical load and vibration. Both the sheet 2 and cloth 3 may be made of materials having high thermal resistivities, that is, those materials having resistivity values of $$\frac{0.2° \text{ C. inch}}{\text{watt}}$$

or greater at room temperature. The sheet 2 further should have a surface displaying low thermal emissivity characteristics, that is, the emissivity values should be no greater than 0.5 at room temperature.

Referring again to Fig. 1, the metal cloth 3 is in contact with the metal sheet 2 at a plurality of points overlying each junction 7 of the cloth 3. Since it is desirable to provide the maximum resistance to the transfer of heat from the metal sheet 2 to the metal cloth 3, the strands 5 and 6 should be of minimum size to reduce the area of contact between the metal cloth 3 and the metal sheet 1. Also, the mesh of the cloth (i.e., the number of tranverse and longitudinal strands per inch) should be at the minimum consistent with the development of adequate strength. Additionally, it may be desirable to deliberately oxidize the wire cloth, so that these points of contact will offer more resistance to the flow of heat between the sheet 1 and the cloth 3. Means for securing metal cloth 3 to sheet 1 may be provided if desired, as for example spot welds 8. Welds 8 should be placed at irregular points to prevent the existence of a path of high thermal conductivity which will occur if the welds 8 of adjacent insulating layers 1 are in overlying relationship. It will be noted that transverse strands 5 and longitudinal strands 6 of cloth 3 serve to divide the volume occupied by the cloth 3 into a plurality of small cells which serve to reduce the amount of heat transferred by convection across the space occupied by metal cloth 3.

In other words, the capabilities of my thermal insulation system are derived from using sheets of material having surfaces of low thermal emissivity to serve as a heat radiation barrier and from providing a spacing member having a configuration between such sheets to reduce to the minimum its contact with the adjacent metal sheets and formed of a material such that maximum resistance to the transfer of heat by conduction is obtained, and further from providing a spacing member of a configuration so as to restrict the flow of air between adjacent sheets and thereby reduce the transfer of heat by convection.

As an illustration of the thermal insulating properties of the thermal insulation system of this invention, the thermal resistivity for such a system comprising two basic insulation layers each formed of 0.010" stainless steel sheets and 18 mesh stainless steel metal cloth formed of wires of 0.010" diameter to produce a total thickness of insulation of 0.060" measured $$\frac{550° \text{ C. in.}}{\text{watt}}$$

as compared to $$\frac{1010° \text{ C. in.}}{\text{watt}}$$

for rock wool insulation.

Because it is made entirely of metal, the thermal insulation system is extremely resistant to shock and vibration. It possesses great physical strength in compression because of the mechanical construction wherein the cloth 3 supports the sheet 2 at a plurality of closely spaced points.

The above description of my insulation comprising elements assembled to form a system can be used in any organization requiring insulation having the attributes described above. I have discovered that a new combination of elements is made possible by using it with an electromagnetic pump structure, not only for protecting the electrical components but also for supporting the heavy magnetic cores necessary for pump operation.

Referring now to Fig. 2, I have shown an application of my thermal insulation system relating to an electromagnetic liquid metal pump. A liquid, such as liquid sodium, is pumped through the flat rectangular pipe or conduit 12. Thermal insulation systems 11, similar to the one shown in Fig. 1, are positioned immediately above and below pipe 12 to insulate magnetic stators 13 from pipe 12. The thermal insulation system 11 positioned below pipe 12 serves as the supporting structure for pipe 12 without the aid of other mechanical structure.

In winding slots 14 of stators 13 are positioned electrical windings 15 which, upon energization, produce a traveling magnetic field to pump the liquid through the pipe. Windings 15 are covered with electrical insulation 16 which is essential to prevent the short circuiting of the windings. The insulation 16 cannot withstand the high temperatures of a liquid metal flowing through the pipe 12 without being insulated therefrom. Additionally, the magnetic permeability of the stators 13 is reduced by increased temperature. Tests have shown that the transfer of heat from the pipe 12 through insulation system 11 to the stators 13 and to the electrical insulation 16 is not sufficient to damage electrical insulation 16 or to impair the operation of the pump despite the fact that the teeth 17 of stators 13 were in direct contact with the thermal insulation systems 11. Additionally, because of the uniformity of thickness of insulation systems 11, the thickness of the insulation may be reduced to a minimum with the result that the number of ampere turns required of the coils 15 is likewise reduced to a minimum.

It is preferable, in this case, to use metal sheets 2 made of a non-magnetic material, as for example stainless steeel, AISI type 302. It is further desirable if the sheets 2 are slotted as indicated at 9 and 10 in Fig. 1 to reduce the transverse eddy currents in sheets 2. Further, to reduce transverse eddy currents in cloth 3, welds 8, if used, are placed at preselected points so that a minimum number are located on any transverse or longitudinal strand.

From the foregoing, it is readily apparent that my invention provides an insulation system adaptable for use in a high temperature region and which will serve as a mechanical spacer without the aid of additional support. It is likewise readily apparent that this thermal insulation system is durable, easy to manufacture, and is adapted for use in a varying magnetic field.

While I have illustrated and described a particular embodiment of my invention, further modifications and improvements thereof will occur to those skilled in the art. I desire it to be understood, therefore, that my invention is not limited to the specific embodiment shown, and I intend in the appended claims to cover all modifications thereof which do not depart from the spirit and scope of this invention.

What I claim as new and desire to secure by Letters Patent of the United States is:

1. An electromagnetic pump comprising a magnetic body having windings therein, a liquid carrying duct in said body extending the length thereof and positioned adjacent said windings so that upon energization of the windings, a magnetic field is established linking said duct and being capable of moving a high temperature liquid linearly therethrough, combined metallic insulation and support means separating said magnetic body from said duct, said insulation and support means comprising a layer of sheet metal having heat reflecting surfaces of low surface emissivity separating said windings from said duct, and a spacing member comprising metallic cloth of high thermal resistivity positioned between said sheet of metal and said duct, said sheet of metal and metallic cloth being placed in contact with each other at spaced intervals and because of their emissivity and resistivity characteristics, impede the transfer of heat between the high temperature liquid and said windings while simultaneously presenting resistance to deformation in the presence of mechanical load and vibration.

2. An electromagnetic pump comprising a pair of stators having windings disposed in the faces thereof and being placed in spaced face-to-face relationship, a duct formed in the space provided by said stators for carrying a high temperature liquid therethrough, so that upon energization of said windings a magnetic field is established for causing said liquid to flow linearly through said duct, combined metallic insulation and support means displaying properties of high thermal resistivity, physical strength and resistance to shock and vibration positioned between said duct and the faces of said stators, said insulation and support means comprising a plurality of alternative layers of metallic wire cloth of high thermal resistivity and metal sheets of high thermal resistivity and low surface emissivity, said wire cloth being composed of a plurality of small cells formed by the strands and the alternate sheets of metal placed in contact therewith, said alternate layers of cloth and sheets of metal being effective in forming a heat radiation barrier between said duct and the windings in said stators while simultaneously providing a structure capable of absorbing the weight and vibrations established by said stators during operation.

3. An electromagnetic pump comprising a pair of spaced stators having windings respectfully disposed in the faces thereof and positioned in face-to-face spaced relationship to form a duct therebetween, said duct being capable of carrying a high temperature liquid which is caused to move therethrough by the forces created by a magnetic field resulting from energization of said windings during operation of the pump, combined insulation and support means positioned between said duct and said stators for impeding transfer of heat to the latter, said insulation and support means comprising a series of alternate layers of spaced interwoven metallic strands of high thermal resistivity and strength when loaded in compression position in contact with said duct to provide a minimum of surface contact therebetween, and sheets of metal of high thermal resistivity and low surface emissivity placed between each layer of strands, said strands and sheets being assembled in overlapping relationship to permit differential expansion of said series of layers when a high temperature is caused to flow through said duct while simultaneously presenting a barrier to flow of heat from the duct towards the windings and presenting resistance to deformation in the presence of mechanical load and vibration.

4. The combination according to claim 3 wherein said sheet of metal in each of said series of layers is slotted to reduce transverse eddy currents circulated therein when said windings are energized for causing flow of liquid in said duct.

5. The combination according to claim 3 wherein said strands are welded at widely spaced preselected points to said sheets of metal so that a minimum number of welds are located on any transverse or longitudinal strand for reducing the flow of transverse eddy currents.

References Cited in the file of this patent

UNITED STATES PATENTS

| | | |
|---|---|---|
| 1,956,395 | Montgomery | Apr. 24, 1934 |
| 2,175,630 | Kiesel | Oct. 10, 1939 |
| 2,713,196 | Brown | July 19, 1955 |
| 2,770,196 | Watt | Nov. 13, 1956 |
| 2,865,291 | Watt | Dec. 23, 1958 |

FOREIGN PATENTS

| | | |
|---|---|---|
| 543,214 | Germany | Feb. 3, 1932 |
| 779,545 | Great Britain | July 24, 1957 |